United States Patent
Heidler

(10) Patent No.: US 10,547,226 B2
(45) Date of Patent: Jan. 28, 2020

(54) ELECTRIC MACHINE AND MOTOR VEHICLE

(71) Applicants: AUDI AG, Ingolstadt (DE); Karlsruher Institut für Technologie, Karlsruhe (DE)

(72) Inventor: Bastian Heidler, Kranzberg (DE)

(73) Assignees: AUDI AG, Ingolstadt (DE); Karlsruher Institut für Technologie, Karlsruhe (DE)

( * ) Notice: Subject to any disclaimer, the term of this patent is extended or adjusted under 35 U.S.C. 154(b) by 323 days.

(21) Appl. No.: 15/535,202

(22) PCT Filed: Nov. 26, 2015

(86) PCT No.: PCT/EP2015/002375
§ 371 (c)(1),
(2) Date: Jun. 12, 2017

(87) PCT Pub. No.: WO2016/091360
PCT Pub. Date: Jun. 16, 2016

(65) Prior Publication Data
US 2017/0346360 A1 Nov. 30, 2017

(30) Foreign Application Priority Data
Dec. 10, 2014 (DE) .......... 10 2014 018 338

(51) Int. Cl.
*H02K 3/42* (2006.01)
*H02K 3/487* (2006.01)

(52) U.S. Cl.
CPC .......... *H02K 3/42* (2013.01); *H02K 3/487* (2013.01)

(58) Field of Classification Search
CPC ............... H02K 3/42; H02K 3/487
(Continued)

(56) References Cited

U.S. PATENT DOCUMENTS

| 5,191,246 A | * | 3/1993 | Roxborough | .......... H02K 1/182 310/13 |
| 5,212,419 A | * | 5/1993 | Fisher | ............... H02K 1/12 310/216.061 |

(Continued)

FOREIGN PATENT DOCUMENTS

| CN | 201910675 U | 7/2011 |
| CN | 103441648 A | 12/2013 |

(Continued)

OTHER PUBLICATIONS

Chinese Office Action dated Aug. 28, 2018, in connection with corresponding CN Application No. 201580067393.0 (18 pgs., including machine-generated English translation).
(Continued)

*Primary Examiner* — Forrest M Phillips
(74) *Attorney, Agent, or Firm* — Maier & Maier, PLLC

(57) ABSTRACT

Electric machine, including a stator on an at least partially electrically conductive housing located on a reference potential, on which are formed slot-like receptacles for stator windings, upon which slot-shaped receptacles are formed for the stator windings, wherein a closure element closing the receptacle on the side of the rotor is provided in each case in the receptacles, and a rotor rotatably mounted in the stator, wherein the closure element is provided with a flat, electrically conductive conductor region for shielding the stator windings from the rotor, wherein the conductor region is connected in an electrically conductive manner to the housing.

7 Claims, 3 Drawing Sheets

(58) Field of Classification Search
USPC .......................................................... 310/256
See application file for complete search history.

(56) References Cited

U.S. PATENT DOCUMENTS

| | | | | | |
|---|---|---|---|---|---|
| 5,661,353 | A | * | 8/1997 | Erdman | H02K 11/01 310/214 |
| 5,821,649 | A | * | 10/1998 | Langhorst | H01R 13/6485 310/68 R |
| 5,821,652 | A | * | 10/1998 | Hyypio | H02K 11/01 310/83 |
| 5,979,087 | A | * | 11/1999 | Bell | H02K 3/487 310/216.001 |
| 6,157,109 | A | * | 12/2000 | Schiferl | H02K 1/16 310/216.019 |
| 6,202,285 | B1 | * | 3/2001 | Bell | H02K 15/12 29/596 |
| 6,242,840 | B1 | * | 6/2001 | Denk | H02K 1/12 310/190 |
| 2010/0007235 | A1 | * | 1/2010 | Chretien | H02K 11/01 310/213 |
| 2012/0112571 | A1 | * | 5/2012 | Stephens | H02K 5/128 310/55 |
| 2012/0161570 | A1 | * | 6/2012 | Schutten | H02K 3/345 310/215 |

FOREIGN PATENT DOCUMENTS

| | | |
|---|---|---|
| CN | 203984139 U | 12/2014 |
| EP | 1 840 910 A1 | 10/2007 |
| EP | 2161816 A1 | 3/2010 |
| EP | 2469687 A2 | 6/2012 |

OTHER PUBLICATIONS

Office Action dated Apr. 11, 2019 in corresponding Chinese Application No. 201580067393.0; 15 pages.
International Search Report and Written Opinion dated Jun. 17, 2016 in corresponding PCT/EP2015/002375; 16 pages.
German Office Action dated Oct. 16, 2015 in corresponding DE 10 2014 018 338.6; 6 pages.
International Preliminary Report on Patentability dated Nov. 25, 2016 in corresponding PCT/EP2015/002375; 12 pages.
Translation of the International Preliminary Report on Patentability dated Jun. 15, 2017, in connection with corresponding international Application No. PCT/EP2015/002375 (5 pgs.).
Office Action dated Oct. 16, 2019, in corresponding Chinese Application No. 201580067393.0; 15 pages.

* cited by examiner

ELECTRIC MACHINE AND MOTOR VEHICLE

FIELD

Exemplary embodiments of the invention relates to an electric machine comprising a housing, which is at least partially electrically conductive and located on a reference potential, and a stator on which are formed slot-like receptacles for stator windings, wherein in the receptacles are provided closure elements closing the receptacle on the rotor side, and a rotor which, is rotatably mounted inside the stator. In addition, the invention also relates to a motor vehicle that includes such an electric machine.

BACKGROUND

Similar electric machines are designed in particular as asynchronous machines, but also as permanent or externally excited synchronous machines, and they have been considered already for some time for the drive of motor vehicles. A sheet metal package is provided for the construction of the stator, which has slot-like receptacles for the stator windings that are mutually insulated from one another. The receptacles can be closed by a closure element, which is often referred to as a slot wedge. The stator windings are typically fed via an inverter, which converts multi-phase alternating voltage in the kilohertz range from a direct voltage. For a switching element of the inverter are usually employed power semiconductor components such as IGBT or GTO.

Moreover, a capacitive coupling of these components is created with the electrically insulated arrangement of the stator windings opposite the rotor on the one hand, and of the capacitive coupling of these components of the sheet metal package on the other hand. In addition, the switched on inverters have also a voltage zero component, which provides a common mode voltage for the reference potential, in particular for the ground potential. Through so called parasitic capacities, the common mode voltage is applied to a shaft of the electric machine and it generates in this manner a shaft voltage for the reference potential. At the same time, so-called du/dt currents occur in particular at one or at several bearings of the machine. In addition, the shaft voltage generates stochastic breakdowns with the bearing lubricant, which leads to an erosion of sparks (electrical discharge machining, EDM) of metallic bearing components. These EDM currents can lead to bearing damage within a relative short operating time period.

SUMMARY OF THE DISCLOSURE

A task of the invention is therefore to provide and electric machine in which the effects occurring due to the capacitive coupling between the windings carrying the common mode voltage and the rotor are reduced.

In order to achieve this objective, a machine of the type mentioned in the introduction is provided, wherein the closure element is equipped with a flat, electrically conductive conductor region for shielding the stator winding from the rotor so that the conductor region is connected to the housing in an electrically conductive manner.

An embodiment of the invention is based on the realization that electrostatic shielding of the stator windings from the rotor is realized when a conductor region that is connected to the reference potential is arranged only in the space that is in the immediate vicinity between the stator windings and the rotor. A significant reduction of the parasitic capacitance between these regions is thus achieved. In contrast to a continuous formation of a conductor region between the stator and the rotor, the arrangement of the conductor region in the receptacles leads to an advantageous suppression of eddy currents. Known electric machines without a closure element can thus be simply retrofitted in an advantageous manner, or existing closure elements can be replaced by embodiments according to the invention. In the past, locking elements were generally not used for the purposes of traction in the field of electric machines.

An embodiment of the invention is thus advantageously based on a robust technical basis because it has been known for a very long time that closure elements, and in particular slot wedges, can be used in electric machines.

It is practical when the closure element is in this case designed in such a way that that the conductor region is formed over the entire length of the receptacle. This makes it possible to ensure shielding of the parasitic capacitance region over the entire length of the stator. An improved reduction of the capacitive coupling is thus advantageously obtained as opposed to a merely partial formation of the conductor region along the closure element. It is in this case expedient when the conductor region is formed in such a way that the entire width of the closure element so that the receptacle is completely shielded.

In an electric machine according to invention, it is particularly advantageous when the conductor region is continued at least beyond a front side of the stator in the form of a conductor region extension and when it is arranged between the rotor and at least one winding head comprising several stator windings. Such winding heads designed on the front side contribute to a great extent to the capacitive coupling between the stator and the rotor, which can be avoided when the conductor region ensures a shielding through a conductor region extension beyond the receptacle. This conductor region extension can be designed as a continuation of the closure element, although it is preferred when the conductor region extension is formed from an additional element that is electrically conductive and connected to the conductor region. As a result, a further reduction of the parasitic capacitive coupling can be achieved.

In an advantageous further development, the conductor region extension is continued in a trapezoidal shape starting from the closure element and/or electrically connected conductively to a housing section. Since the winding head typically has wider dimensions on the front side than the receptacle, it is possible to broaden the conductor region extension in a trapezoidal shape.

At the same time, the base side of the trapeze form on the side of the receptacle is narrower than the opposite side. It is expedient when this opposite side can be electrically connected in a conductive manner to a section of the housing. It is preferred when the conductor region extension is carried out for the greatest possible reduction in the capacitance by leading to the housing section close to the winding head.

It is advantageous when the above-mentioned embodiments of an electric machine according to the invention are designed in such a way that the conductor region is formed as a first surface layer of the closure element. It is in this case conceivable that in particular a coating of a base body with an electrically conductive material could be used. At the same time, all electrically conductive materials and alloys of these materials having a sufficient electrical conductivity can be considered, such as for example copper or aluminum. The surface layer can be in particular provided with a thickness between 100 nm and 10 µm, while a thickness between 1 µm and 5 μm is preferred. All coating processes can be considered for the realization of the surface layer, which make it possible to realize a surface layer with the specified thickness, such as for example spraying or dip coating processes, or gas phase deposition processes. It may be also expressly provided that the first surface layer is formed over the entire surface layer of the closure element. An advantageous reduction of the capacitive coupling between the stator winding and the stator sheet metal package can thus be achieved in this manner. Overall, the realization of the conductor region as a first surface layer contributes to the fact that due to the thin cross-section of the conductor region enabling through flow, eddy currents are largely suppressed.

According to a further practical development of the electric machine, the conductor region is formed so that it is formed at least partially from an electrically conductive material or from a foil that is coated with an electrically coated material. This relates in particular to a continuation of the conductor through an electrical conductive foil that is connected to it as a conductor region extension.

Therefore, this represents an embodiment of the conductor region expansion that can be easily realized. The description listed in the previous paragraph can be mentioned here with respect to the material and to the thickness of the electrically conductive coating of the foil. The same is applicable also to the details listed therein. Furthermore, in addition to the conductor region expansion, the first surface layer can be also realized by laminating the closure element with such a foil.

If is further also preferred for an electric machine according to the invention when the conductor region has an electrically insulating second surface layer at least in a contact region with the stator. The efficient avoidance of eddy currents in the conductor region requires a sufficient electric insulation between the conductor region of the individual closure element and the sheet metal package of the stator. For this purpose is preferred the application of an insulating second surface layer to the conductor region that is formed in particular as the first surface layer. This relates in particular to the contact region with the metal sheet package, but other sections of the conductor region can be also included. Spraying or dip coating is particularly suitable for realizing the second surface layer.

In principle, it is expedient when the closure elements comprise a base body that is made of a plastic material, in particular a thermoset plastic material. Such plastic materials are usually not electrically conductive and therefore they limit occurrences of eddy currents in the conductor region so that they are largely suppressed. For this purpose, it is particularly suitable when the closure elements are formed from a thermoset plastic material, while the selection of the material to be used must be made so as to ensure a sufficient temperature resistance in view of the temperatures typically occurring in an electric machine.

It is advantageous when the electric machine according to the invention is designed so that a ground potential is selected as the reference potential. This corresponds in particular to the ground potential of the feeding inventor, so that an effective reduction of the capacitive coupling is produced with the shielding.

In addition to the electric machine, the invention relates also to a motor vehicle that is provided with an electric machine according to the invention. All embodiments relating to the electric machine can be analogously applied also to the motor vehicle, so that the advantages mentioned above can be achieved also with these embodiments.

BRIEF DESCRIPTION OF THE DRAWINGS

Further advantages and details of the invention will become evident from the embodiments described below with reference to the attached drawings, which indicate the following.

DETAILED DESCRIPTION OF THE DRAWING

Figure 1:
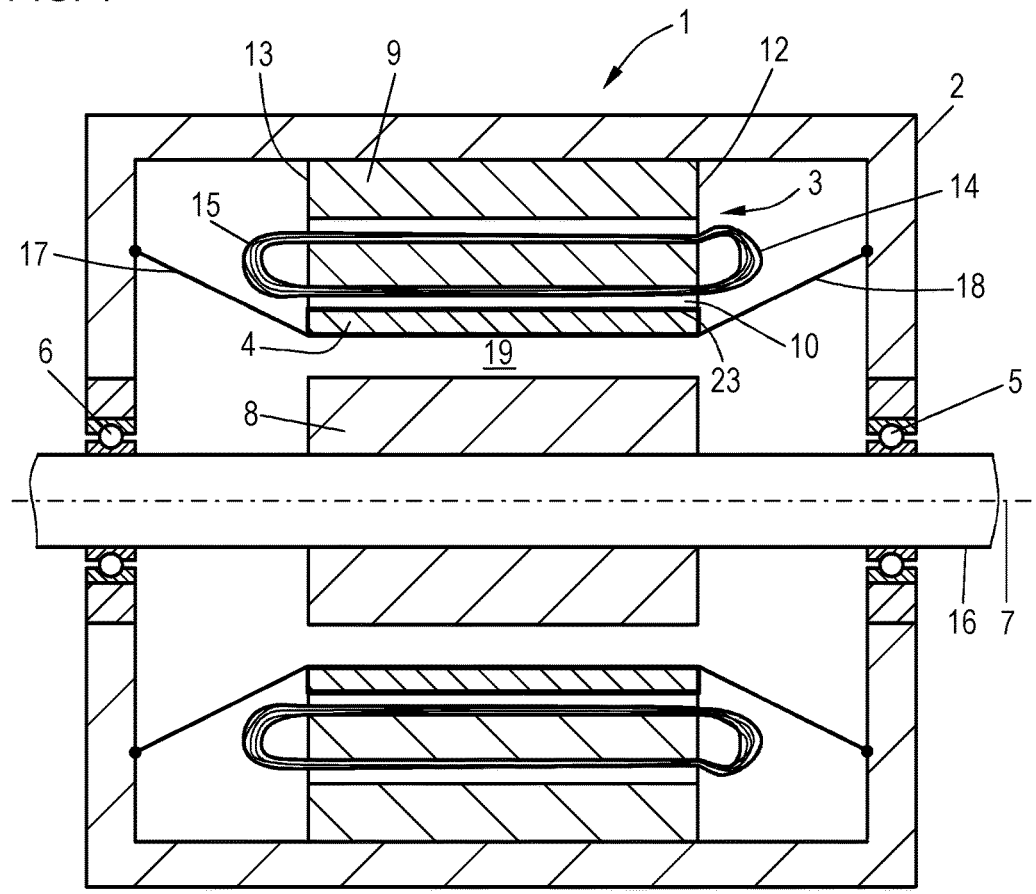
FIG. 1 a schematic representation of a section of an electric machine according to the invention, FIG. 2 a schematic representation of a section of a closure element according to the invention, FIG. 3 a schematic representation of a closure element according to the invention in top view, FIG. 4 a vehicle according to the invention.

FIG. 1 shows an electric machine 1 according to the invention comprising a housing 2, a stator 3 and rotor 8 rotatably mounted about a rotational axis 7 by means of a shaft 16 and two bearings 5 and 6. In this case, the stator 3 is provided with a sheet metal package 9 having several receptacles 10 on the side of the rotor through which the stator windings 11 are extended. The receptacles 10 are respectively closed by a closure element 4. A winding head 14, 15 is formed, respectively, on the front sides 12, 13 of the stator 3.

On the closure element 4 is formed over its entire length a conductor region 23, which is respectively provided on the front sides 12, 13 with a conductor region extension 17, 18 consisting of an electrically conductive foil. These extensions are connected to the housing 2, which is located at the ground potential, in an electrically conductive manner.

In such an electric machine 1, parasitic capacitances are formed between the stator winding 11 with the winding head 15 and the rotor 8 because a common mode voltage is applied between these conductor elements, and they are separated by an air-filled space 19 that acts as a dielectric. This capacitance, however, is reduced because the conductor region 23 of the closure element 4 that is extended in the stator winding 11 inside the sheet metal package is shielded from the rotor 8, and the conductor region extensions 17, 18 also cause a shielding effect of the winding heads 14, 15. The conductor region extensions 17, 18 are deployed next to the winding heads 14, 15 in order to generate as high a capacitance between them as possible, which, however, is located on the ground potential via the housing 2 and thus causes a reduction of the total capacitance. This is a result of the fact that the total capacitance can be understood as being due to the insertion of the closure element with a serial connection of two partial capacities, which is always less than the smallest individual capacitance.

Figure 2:
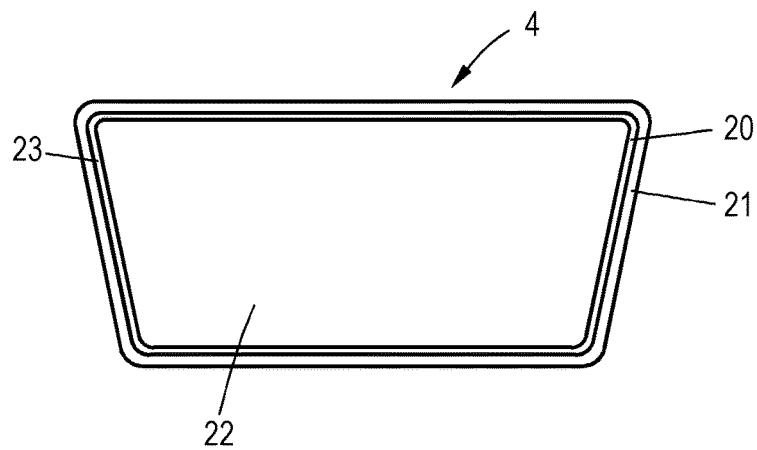
Figure 3:
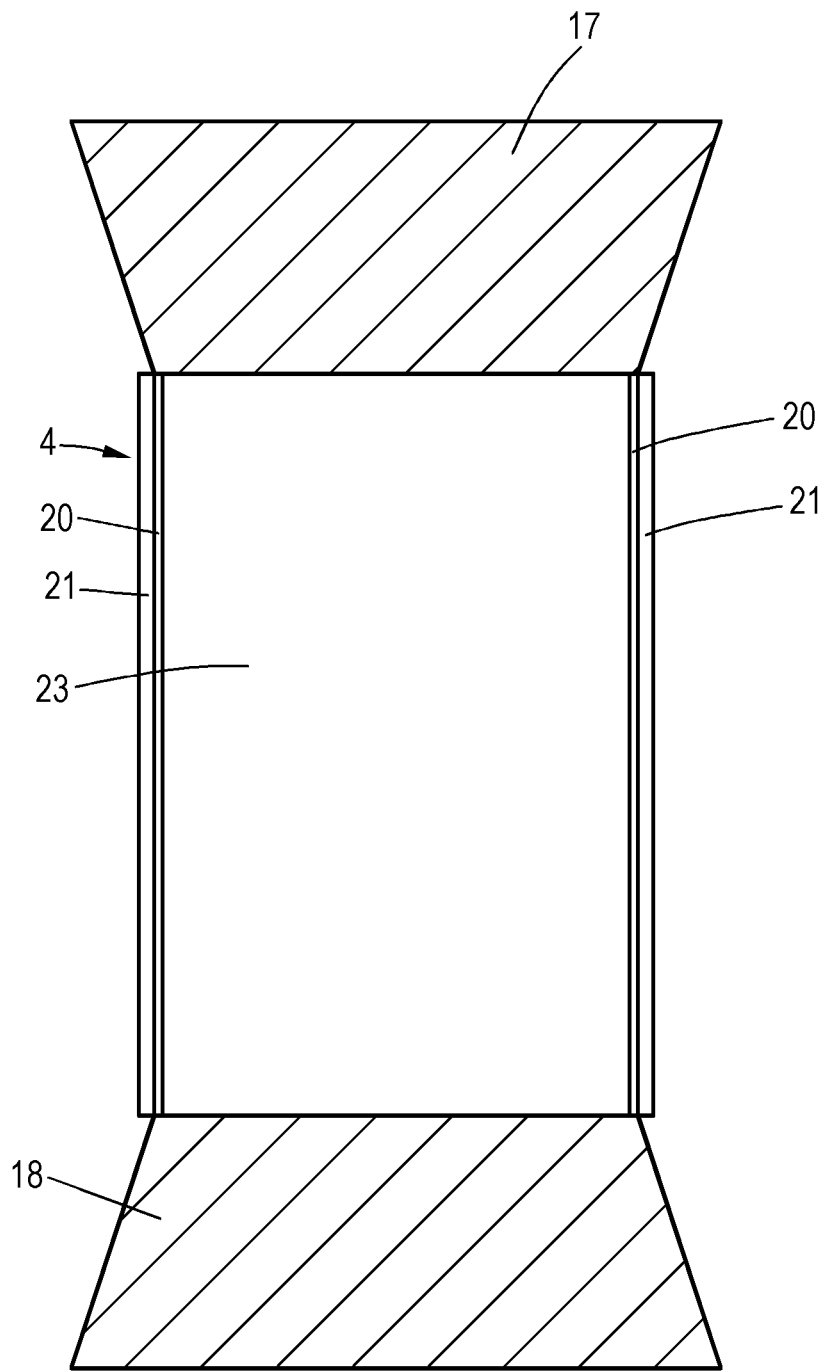

FIG. 2 and FIG. 3 show schematic representations of a closure element 4, wherein FIG. 2 is a sectional illustration and FIG. 3 shows a top view of the broad base surface of a wedge-shaped closure element 4. A first surface layer 20, which is made of copper and which forms the conductor region 23, is applied over the entire length and width of a base body 22. It is again provided with a second surface layer 21 that is made of an electrically insulating lacquer. The first surface layer 20 is designed with a thickness of 1 μm and it therefore provides a high electric resistance for eddy currents. The second surface layer 21 is formed to be significantly stronger, while the size relationships are not indicated according to scale. In addition, the first surface layer 20 is connected in an electrically conductive manner to two conductor region extensions 17, 18. These extensions are formed from a plastic foil onto which a thin silver layer is vapor-deposited in such a way that the conductor region 23 can be connected in an electrically conductive manner to the housing. The second surface layer 21 is in this case designed in order to insulate the conductor region 23 from the sheet metal package 9 of the stator 3.

Figure 4:
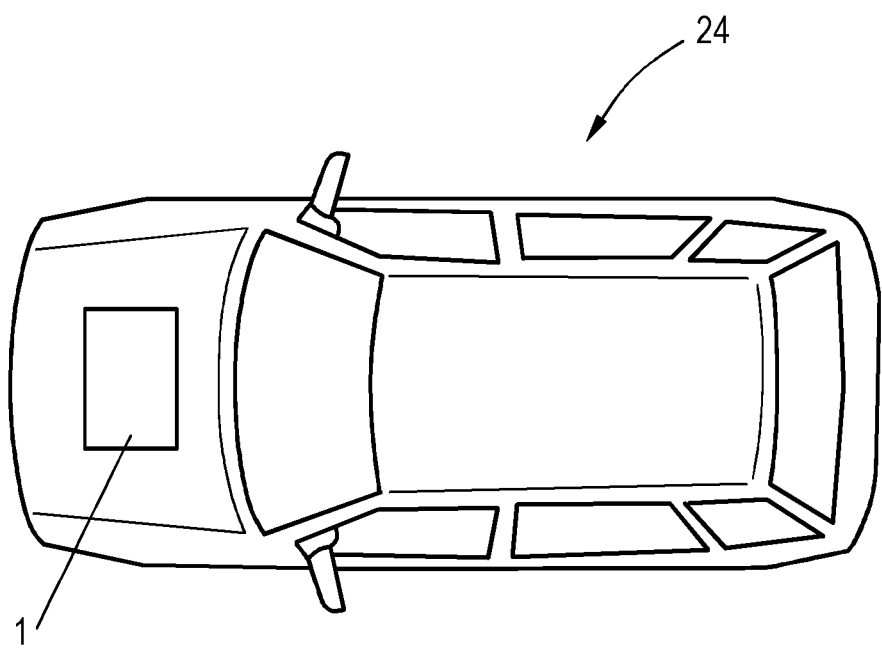

Finally, FIG. 4 shows a motor vehicle 24 according to the invention that contains a built-in electric machine 1 for driving the vehicle. Thanks to the shielding of the stator windings 11 from the rotor 8 by means of the closure element 4 that is employed in the machine 1, the EDM currents caused by the bearings 5, 6 can be prevented and a longer durability of the electric machine 1 can be achieved in the motor vehicle.

The invention claimed is:

1. Electric machine comprising:
   a stator on an at least partially electrically conductive housing located on a reference potential, on which are formed slot-like receptacles for stator windings, wherein a closure element is provided in the receptacles closing the receptacle on the side of the rotor, as well as a rotor which is rotatably mounted in the stator, wherein closure element is equipped with a flat electrically conducting conductor region for shielding the stator windings opposite the rotor, wherein the conductor region is connected in an electrically conductive manner with the housing, wherein the conductor region is continued through at least one front side of the stator in the form of a conductor region extension and arranged between the rotor and the at least one winding head comprises a plurality of stator windings and
   Wherein the conductor region extension is deployed so that it is directed radially outwardly to a housing section,
   Wherein the conductor region extension is formed on a planar trapezoidal shape starting from the closure element and electrically connected conductively to the housing so that a parasitic capacitance is reduced in a vicinity of the at least one winding head, and
   Wherein the closure elements comprise a base body, and the conductor region is designed as a first surface layer over a surface of the base body of the closure element.

2. The electric machine according to claim 1, wherein the conductor region is formed over the entire length of the receptacle.

3. The electric machine according to claim 1, wherein the closure elements comprise a base body made of a thermoset material.

4. The electric machine according to claim 1, wherein the conductor region is formed at least partially from an electrically conductive material, or from a foil that is coated with an electrically conductive material.

5. The electric machine according to claim 1, wherein the conductor region is provided with an electrically insulating second surface layer at least in the region that is in contact with the stator.

6. The electric machine according to claim 1, wherein the base body is made of a plastic material.

7. The Electric machine according to claim 1, wherein the grounding potential is selected as the reference potential.

* * * * *